Feb. 24, 1948. F. DASHMAN 2,436,422
TROUT REEL
Filed May 7, 1946
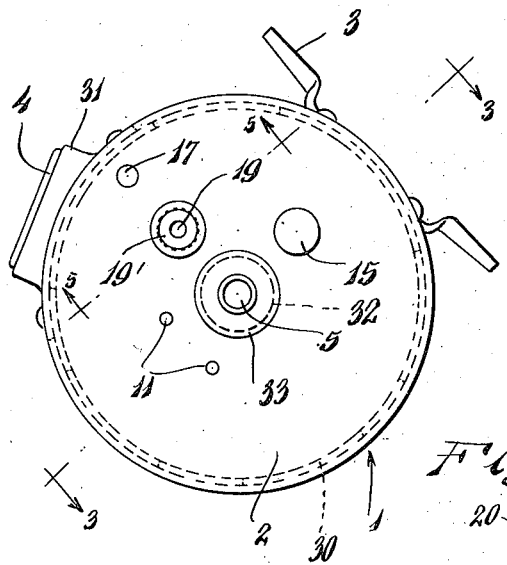
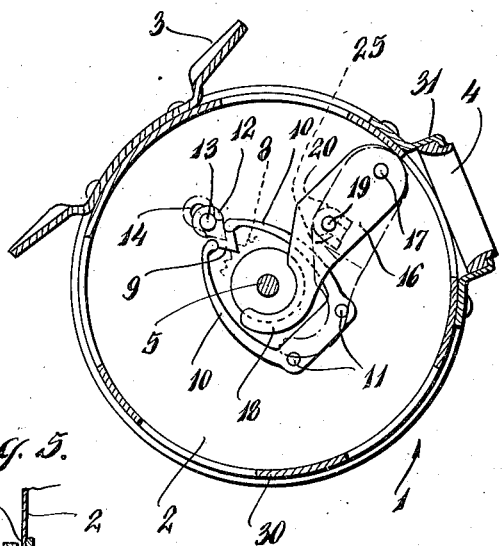
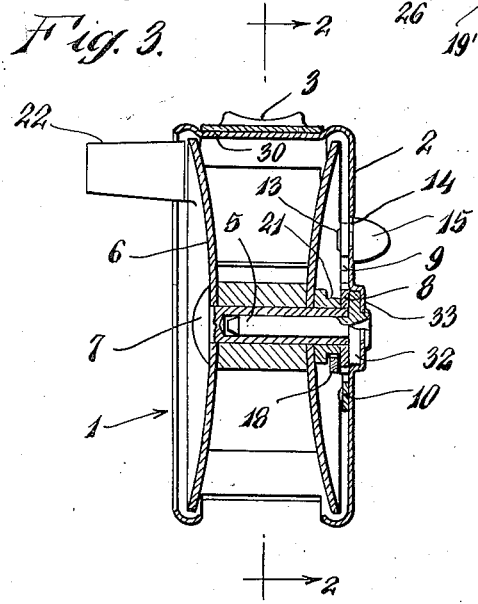
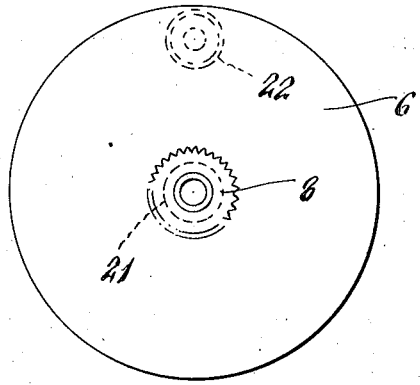
INVENTOR
Francis Dashman
BY Henry G. E. Metzler
Att.

Patented Feb. 24, 1948

2,436,422

UNITED STATES PATENT OFFICE 2,436,422

TROUT REEL

Francis Dashman, New York, N. Y.

Application May 7, 1946, Serial No. 667,873

2 Claims. (242—84.6)

1

The present invention relates to improvements in fishing reels and, more specifically, to a new and improved trout reel.

Fishing-reels are ordinarily so constructed that the spool rotates in fixed bearings, and in casting the line is delivered from the spool, which is made to revolve with minimum friction. It is necessary, however, that a slight brake shall be applied to the reel, and this is commonly done by the thumb of the angular. It requires the utmost skill to apply the pressure to the exact degree necessary to prevent the spool from revolving faster than the bait flies and the line runs out, and consequently a slack occurs in the line, and it is liable to be wound on the spool in the contrary direction to that in which it was originally wound. In other words, what is called "backlashing" occurs by the overrunning of the spool, and thus the cast or flight of the bait is suddenly arrested, and often, when this occurs, the bait is separated from the hook and is lost. The line must then be drawn off the spool, and frequently it is so tangled as to require considerable time to straighten out.

It is the object of my invention to avoid these results and to enable the line to be delivered from the spool without any danger of overrunning, by applying a very simple and handy ratchet mechanism which can be put into, or out of, operation by manipulating a knob with a finger;

Another object of the present invention is the provision of a new and improved trout reel whose spool or rotatable reel member can be detached from the reel case in a very simple manner and without the application of any considerable amount of skill, and which likewise can be re-attached to the case and safely held thereon without any possibility of losing the spool while the reel is in operation;

Still another object of the present invention is the provision of a new and improved trout reel which is provided with an improved arrangement of a ring collar through which the fishing line passes and which reduces the friction on, and the wear and tear of, the line to a minimum;

Yet still another object of the present invention is the provision of a new and improved trout reel which is light in weight, small in size, of a pleasant and attractive appearance, simple in construction consisting of only few inexpensive parts which can be manufactured and assembled at a low cost in mass production, but which is sturdy, durable and well adapted to withstand the rough usage and the influence of rain and humidity to which devices of this type are frequently subjected.

In the drawing:

Figure 1 is a rear elevation of a preferred embodiment of my invention;

Figure 2 is a sectional view on the line 2—2 of Figure 3;

Figure 3 is a sectional view on the line 3—3 of Figure 1;

Figure 4 is a plan view of a detail which will be explained hereinafter; and

Figure 5 is a detailed sectional view on the line 5—5 of Figure 1.

Similar reference characters refer to similar parts throughout the several views.

In the drawing the numeral 1 denotes a preferably circular reel case of light metal, plastic material or the like, which has a vertical wall 2 and a circular perforated horizontal wall which is bulged outwardly at both extremities so as to form two annular grooves between which there is a circular rim portion 30. A reel seat 3 is secured to the outer side of the rim portion 30 for connecting my new and improved trout reel to a fishing rod (not shown) in a well known manner. A collar ring 4 having outwardly curved extremities is attached to the rim portion 30 in spaced relation to the reel seat 3, preferably by means of a ring frame 31, in such a manner that it is in spaced relation to that radial perforation through which the fishing line passes, as may be seen in Figures 1 and 2. This arrangement allows a very smooth passing of the fishing line (not shown) through the radial perforation in the rim 30 avoiding friction on any sharp edges by guiding the line along the curved smooth surface of the ring 4, which consists of steel, plastic material, or the like.

The vertical wall 2 of the reel case 1 has an outwardly bulged center portion 33 (Fig. 3), and a spindle 5 has a collar portion 32 which engages said outwardly bulged center portion of the vertical reel wall and is secured thereto in such a manner that the major portion of spindle 5 extends into the case 1. The spindle 5 is preferably secured to the center portion 33 by means of riveting as shown in Fig. 3.

The reel 6, whose flanges are preferably diverging concavo-convex (Fig. 3), is rotatably carried by the spindle 5. Its center part, which can consist of one or more members that are closely connected to each other, has at one side a button or head 7 and at its other side a hub which is provided with an annular groove 21 and to whose extremity is secured a ratchet wheel 8 (Fig. 4).

A handle 22 is attached to one of the flanges of the reel 6. The outer diameter of said reel flanges being substantially the same as the inner diameter of the rim portion of said circular horizontal wall, so that said reel cannot revolve without overcoming some frictional resistance between the rear reel flange and said rim unless the periphery of the reel flanges is adjacent said outwardly bulged annular grooves as shown in Fig. 3.

The ratchet mechanism of my new and improved trout reel preferably consists of a pawl pivotally and radially shiftably arranged within said case and adapted to engage said ratchet wheel 8, and of a pair of resilient arms 10 attached by means of rivets 11 or the like to the inner side of said vertical wall and pressing with their extremities upon two opposite sides of the pawl (Fig. 2). The pawl has a pointed portion 9 and a hub portion 12, which is pivotally secured to a stud 13. The stud 13 is extended through a radial slot 14 in the vertical wall 2 and is joined to, or forms a unit with, a knob 15, which is outside of the case 1. If the parts 9 to 13 are in the position shown in full lines in Figs. 2 and 3, the pawl is in engagement with the ratchet wheel 8, so that the fishing line can be delivered from the reel 6 without any danger of overrunning. If the knob 15 is pushed radially away from the center of the wall 2, the pawl is in the position indicated in dash-and-dotted lines in Fig. 2 and is then no longer in engagement with the ratchet wheel 8. The shape of the pointed pawl portion 9 and the arrangement of the resilient arms 10 as shown will obviously prevent an inadverted change in position of the pawl, so that the latter's functioning is always in the safe control of the operator of my new and improved trout reel.

At spaced relation to the parts 9 to 13 there is pivoted at 17 to the inner side of the wall 2 a latch 16 which has a curved end portion 18 that is adapted to engage the annular groove 21 when it is in the position shown in full lines in Fig. 2. When the latch 16 is swung around the pivot 17, so that it is in position as indicated in dash-and-dotted lines in Fig. 2, the portion 18 no longer engages the annular groove 21 and then the reel 6 can be removed from the case 1. The position of the latch 16 can be controlled safely by manipulating a threaded pin 19, which is extended through a slot 25 in the outwardly bulged portion 20 of the wall 2. In order to retain the pin 19 and the latch 16 in the position in which the portion 18 engages the groove 21 and thus to prevent a losing of the reel 6, I prefer to provide that portion of the pin 19 which protrudes over the outer side of the wall 2 with a nut 19' (Figs. 1 and 5). The nut 19' at its face is preferably provided with a recess 26 and the outer extremity of the pin 19 is widened and engages said recess, so that the nut 19' cannot be lost.

Since certain changes may be made in the above article and different embodiments of the invention could be made without departing from the scope thereof, it is intended that all matter contained in the above description or shown in the accompanying drawing shall be interpreted as illustrative and not in a limiting sense.

Having thus fully described my said invention, what I claim as new and desire to secure by Letters Patent is:

1. In a device of the character described, a circular reel case having a vertical wall and a circular perforated horizontal wall which is bulged outwardly at both extremities so as to form two annular grooves between which there is a circular rim portion, a spindle extending from the center of said vertical wall into said case, a reel having diverging concavo-convex flanges being rotatably carried by said spindle and having at one side a hub which is provided with an annular groove and with a ratchet wheel, a latch pivotally attached to the interior of said case and adapted to engage said annular groove, a threaded pin secured to said latch and extending through a slot which is in an outwardly bulged portion of said vertical case wall, a lock nut screwed upon that portion of said pin which protrudes over the outer side of said vertical wall, a knob having a stud which is extended from the outer side of said vertical wall through a radial slot in the latter into said case, a pawl being adapted to engage said ratchet wheel and being pivotally secured to that portion of said stud which projects over the inner surface of said vertical wall, a pair of resilient arms attached to the inner side of said vertical wall and pressing with their extremities upon two opposite sides of said pawl, a collar ring attached to the outer side of the circular horizontal wall of said case by means of a ring frame in such a manner that it is in spaced relation to that radial perforation through which the fishing line passes, and a reel seat being secured to the outer side of said case and being adapted to connect said case to a fishing rod, the outer diameter of said reel flanges being substantially the same as the inner diameter of the rim portion of said circular horizontal wall so that said reel cannot revolve without overcoming some frictional resistance between the rear reel flange and said rim unless the periphery of the reel flanges is adjacent said outwardly bulged annular grooves in said circular wall portion, all substantially as described.

2. In a device of the character described a circular reel case having a vertical wall which has an outwardly bulged center portion and an outwardly bulged slotted ex-central portion, and a circular perforated horizontal wall which is bulged outwardly at both extremities so as to form two annular grooves between which there is a circular rim portion; a spindle having a collar portion which engages said outwardly bulged center portion of the vertical reel case wall and is secured thereto in such a manner that the major portion of the spindle extends into said case; a reel, rotatably carried by said spindle having flanges whose outer diameter is substantially the same as the inner diameter of the rim portion of said circular horizontal wall and having at one side a hub which is provided with an annular groove and with a ratchet wheel; a latch having a curved extremity adapted to engage said annular groove and being pivoted to the inner side of said vertical wall; a pin secured to said latch and extended through said outwardly bulged slotted excentral portion of the vertical case wall; a lock nut screwed upon that portion of said pin which protrudes over the outer side of said vertical wall; a pawl pivotally and radially shiftably arranged within said case and adapted to engage said ratchet wheel and being kept in the proper position by resilient means; a collar ring attached to the outer side of the circular horizontal wall of said case by means of a ring frame in such a manner that it is in spaced relation to that radial perforation through which the fishing line passes; and a reel seat being secured to the outer side of said case and being adapted to connect said case to a fishing rod; all substantially as described.

FRANCIS DASHMAN.

REFERENCES CITED

The following references are of record in the file of this patent:

UNITED STATES PATENTS

| Number | Name | Date |
|---|---|---|
| 1,797,774 | Holden | Mar. 24, 1931 |
| 1,871,386 | Pflueger | Aug. 9, 1932 |

FOREIGN PATENTS

| Number | Country | Date |
|---|---|---|
| 3,947 | Great Britain | Nov. 17, 1894 |